Figure 1:
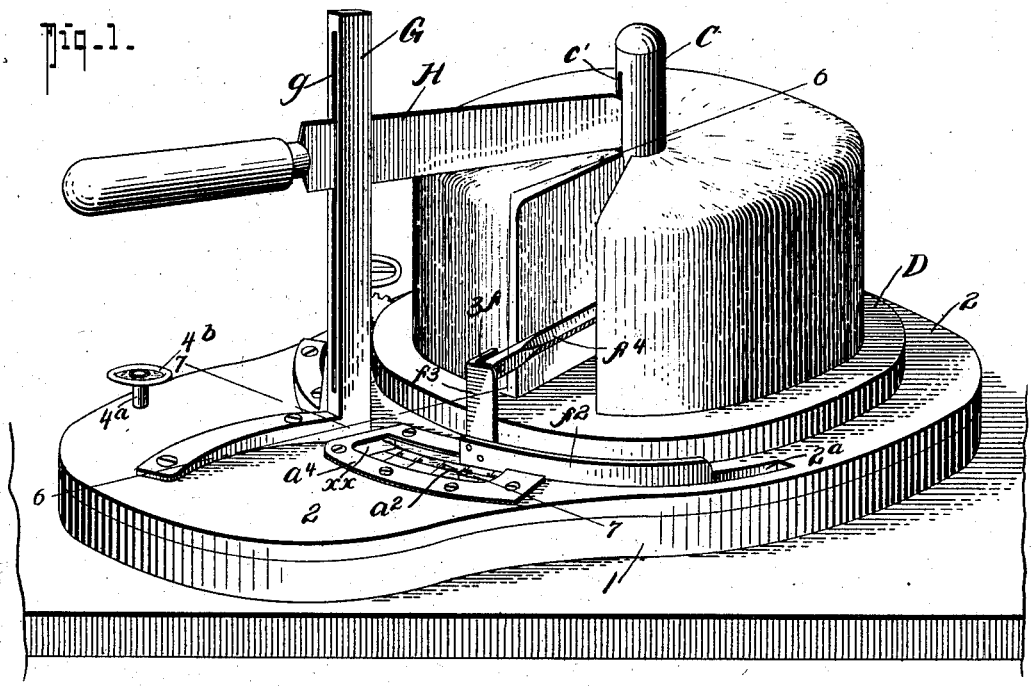

No. 757,335. PATENTED APR. 12, 1904.
P. S. McCROSKEY.
CHEESE CUTTING APPARATUS.
APPLICATION FILED JULY 2, 1903.
NO MODEL. 3 SHEETS—SHEET 1.

WITNESSES:
F. C. Gibson.
John T. Schrott

INVENTOR
Philip S. McCroskey.
BY
Fred G. Dieterich & Co.
ATTORNEYS

No. 757,335. PATENTED APR. 12, 1904.
P. S. McCROSKEY.
CHEESE CUTTING APPARATUS.
APPLICATION FILED JULY 2, 1903.
NO MODEL. 3 SHEETS—SHEET 2.

WITNESSES
F. C. Gibson.
John T. Schott.

INVENTOR
Philip S. McCroskey.
BY
Fred G. Dieterich & Co.
ATTORNEYS

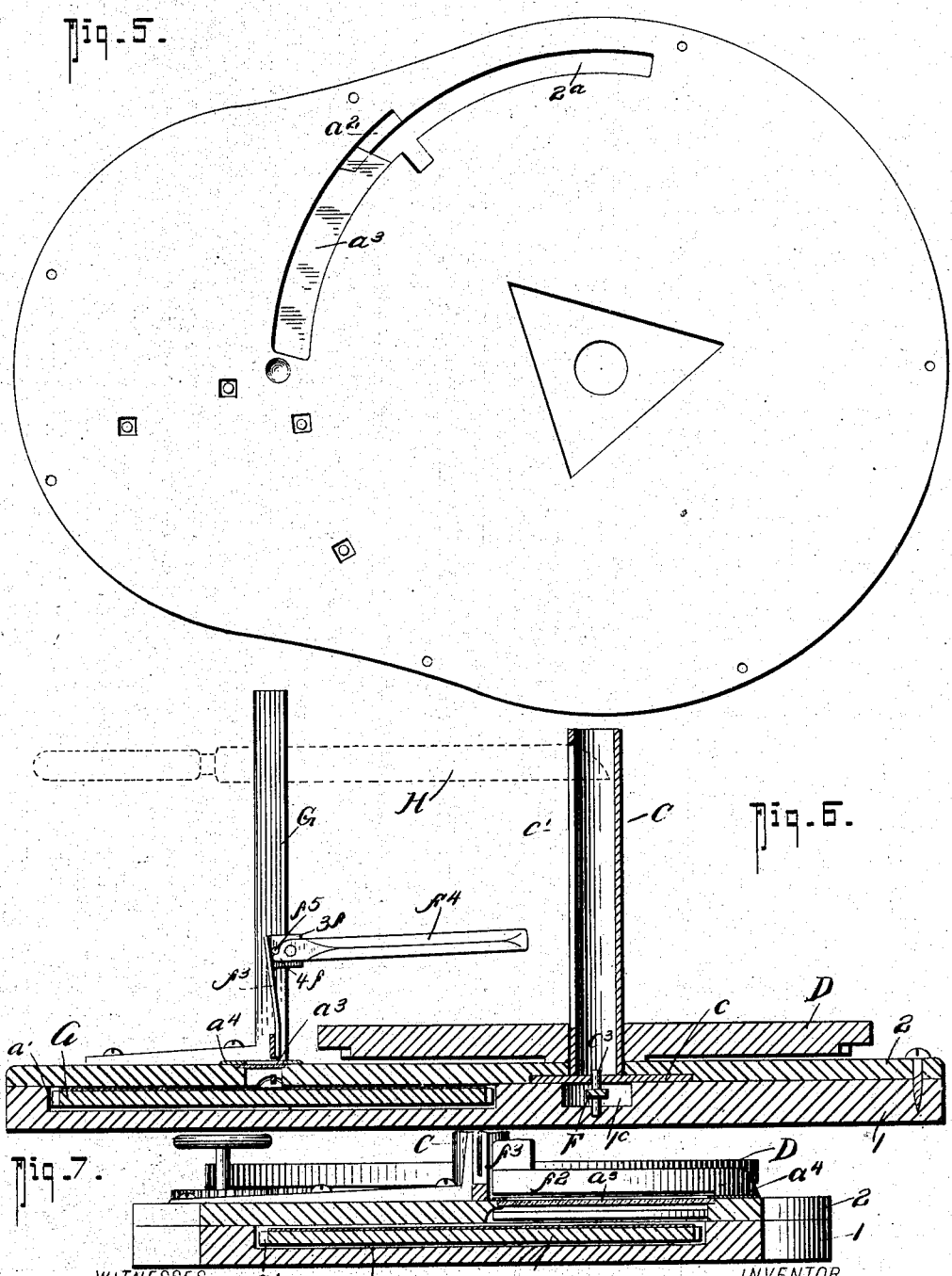

No. 757,335. Patented April 12, 1904.

UNITED STATES PATENT OFFICE.

PHILIP S. McCROSKEY, OF LOGAN, KANSAS.

CHEESE-CUTTING APPARATUS.

SPECIFICATION forming part of Letters Patent No. 757,335, dated April 12, 1904.

Application filed July 2, 1903. Serial No. 164,053. (No model.)

*To all whom it may concern:*

Be it known that I, PHILIP S. McCROSKEY, residing at Logan, in the county of Phillips and State of Kansas, have invented a new and Improved Cheese-Cutting Apparatus, of which the following is a specification.

My present invention refers to improvements in that type of cheese-cutting appliances in which is provided a gage for determining the predetermined size or value of cuts from the cheese, a rotatable cheese-supporting platform, a setting-guide for coöperating with the gage, and a slicing-knife; and the primary object of this invention is to provide a computing cheese-cutting apparatus of the character stated of a simple, durable, and economical construction easily manipulated and by which cheeses of any ordinary size or weight may be quickly and expeditiously cut into portions of predetermined values without waste and with a maximum of accuracy without measuring and by which the segments or slices of vastly different weights or sizes may be cut without special adjustment of the parts.

My invention in its generic nature comprehends a horizontally-disposed rotatable cheese-holding platform, a horizontally-held rotary gage-disk whose axis is located radially to the axis of the rotatable cheese-holder having a series of independent scale-marks which indicate the money values of the slices or segments of the cheeses whose peripheral dimensions correspond with the marks which indicate the said money values of arbitrary relation with respect to each other and to an auxiliary or major scale whose predetermined space-marks indicate the gross money value of the cheeses divisible into the predetermined number of cuts gaged by the minor-scale marks, and a setting or indicator member whose movement is controlled by the rotation of the cheese with its rotatable member.

My present invention also comprehends a cheese-holder rotatable about an axial stationary knife-guide, a setting device or guide movable in a plane concentric with the said axial knife-guide, and an adjustable scale or gage plate having scales or divisions spaced to indicate predetermined values in harmony with the different gross weights or value of cheeses, a slicing-knife, and a fixed guide therefor.

In its more subordinate features my invention embodies certain details of construction and peculiar combination of parts, all of which will be hereinafter fully described, and specifically pointed out in the appended claims, reference being had to the accompanying drawings, in which—

Figure 2:
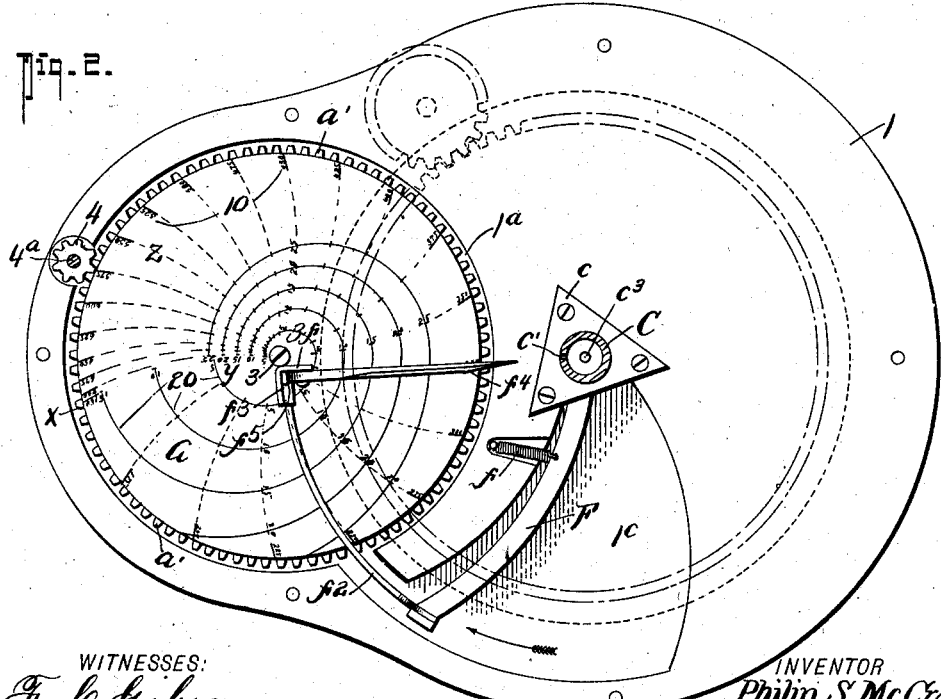
Figure 3:
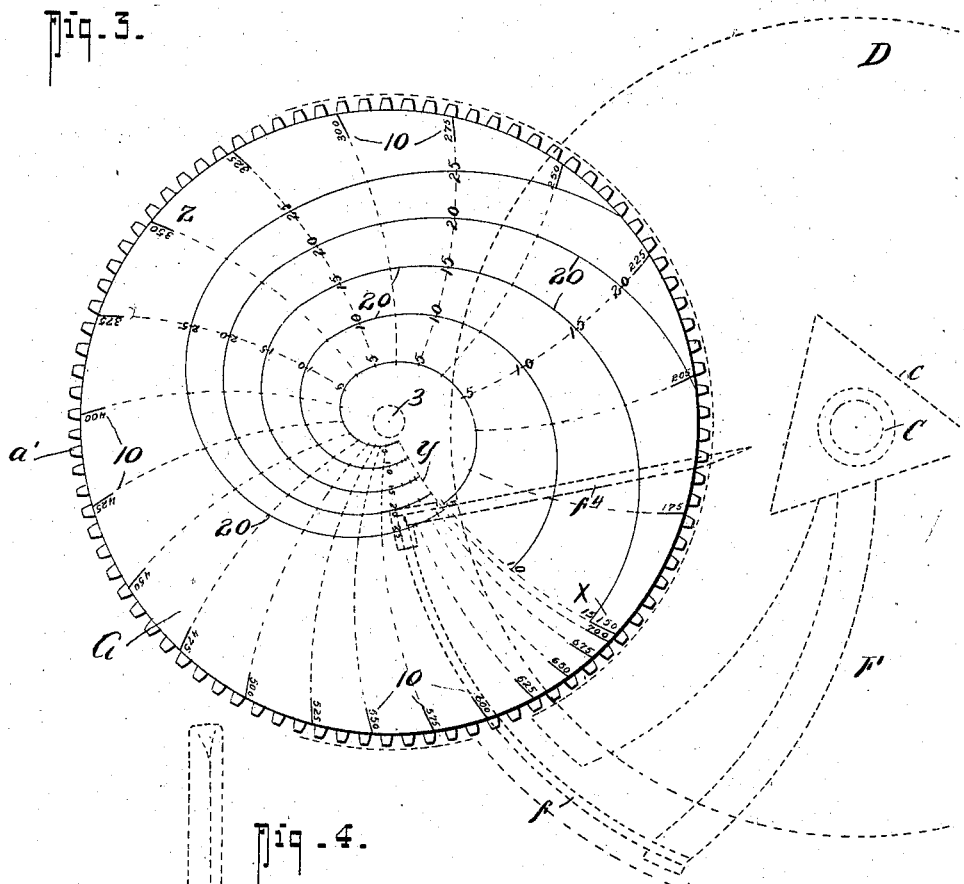
Figure 4:
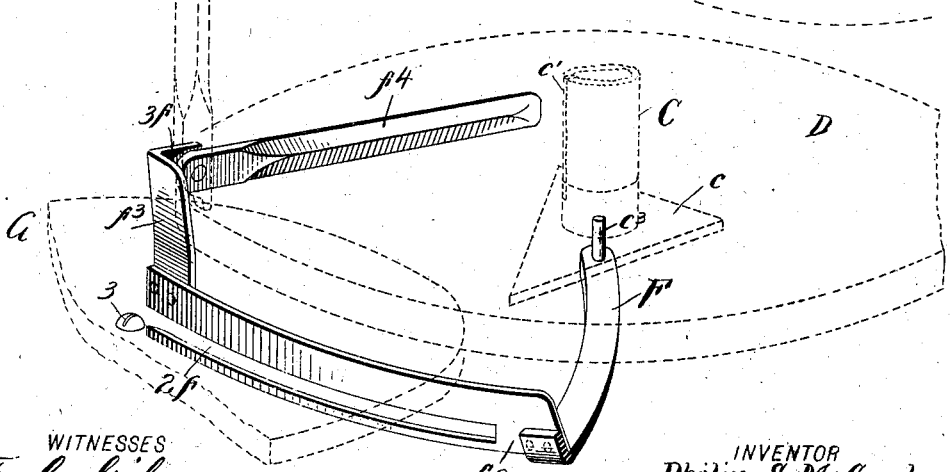

Figure 1 is a perspective view of my improved cheese-cutting apparatus. Fig. 2 is a plan view of the base, the axial guard, the rotary scale-disk, and the centrally-mounted indicator or setting device, the slotted knife-guide and the rotary cheese-holder being indicated in dotted lines. Fig. 3 is an enlarged plan view of the adjustable scale-disk, the axis of the cheese-holder and the sweep of the indicator or setting member being diagrammatically shown. Fig. 4 is a detail perspective view of the indicator or setting member, the rotary or cheese-holding member being shown in dotted lines. Fig. 5 is an inverted plan view of the cover or top member. Fig. 6 is a longitudinal section of the complete apparatus, taken substantially on the line 6 6 of Fig. 1. Fig. 7 is a similar view taken substantially on the line 7 7 of Fig. 1.

In the practical construction of my improved cheese-cutting apparatus the same comprises a base 1 and a removable cover or top member 2 of like contour, which are substantially elongated and circular-shaped at the ends and flat, whereby to readily rest upon the counter to support the cheese in a horizontal plane. At one end the base 1 has a circular recess 1ª, in which is mounted the adjustable scale-disk A, the peculiar construction of which and its coöperative arrangement with the rotatable cheese-holder form an essential feature of my invention. At a suitable distance from the recess 1ª and in radial alinement with the axis of the disk A is a stationary vertically-projected support C, which forms the spindle about which the rotatable cheese-holder D rotates, and the said support or spindle has a non-circular foot portion *c* for conveniently attaching to the base 1. At one side the support C is slitted vertically, as at *c'*, to receive and guide the end of the slicing-knife hereinafter referred to, and the said slit is in a plane radial with the axis of the support C and the axis of the gage-disk A.

The gage-disk A, which is best shown in Figs. 2 and 3, is axially mounted upon a stud 3, and its peripheral edge has cog-teeth $a'$, with which meshes a cog-pinion 4, whose shaft $4^a$ projects up through the cover 2 and has a suitable handle or knob $4^b$ to provide for conveniently turning the pinion 4 to rotate the disk A to bring the same into a proper adjustment with respect to the size or value of the piece to be cut.

The disk A, it will be noticed, has two sets of indicator or scale marks, which are determined on the face of the disk, one set of which, 10, hereinafter designated the "major" scale, being circumferentially spaced at the perimeter of the disk, and the marks 10 of the said major scale are arbitrarily spaced with respect to the different gross values of the cheeses—say from a minimum value of one dollar and fifty cents to the maximum value of seven dollars, the spaces between the said minimum and maximum marks beginning from the one-dollar-and-fifty-cent mark and gradually decreasing in degree proportionate to the increase of the diameters of the cheeses from the one-dollar-and-fifty-cent up to the seven-dollar size.

The minor-gage lines 20 are arranged in series equidistantly spaced at their point of beginning, which is on a line designated $x$, radial with the minimum or one-dollar-and-fifty-cent mark at the perimeter of the disk. All of the lines 20 extend spirally inward and terminate at an imaginary line Y, radial with the maximum or seven-dollar mark on the disk, and the several lines 20 designate the five, ten, fifteen, twenty, and twenty-five cent divisions, by which the scale or gage member hereinafter referred to is set.

In Fig. 3 is shown a number of curved lines Z having an arc concentric with the circumference of the cheese. When the disk is properly adjusted and the said lines Z are drawn from the several major marks 10, it will be noticed that the ends of the spiral lines 20 are at the line Y, from whence the spaces between the several lines 20 gradually increase until the end of the said lines reach the terminal line (indicated by $x$) in alinement with the lower gross price indicated by "$1.50." By thus combining the minor-scale lines with the major-scale marks it will be noticed the minimum spaces between the five, ten, fifteen, twenty, and twenty-five cent lines (designated by 20) are on the line Y, from whence the said spaces between the lines 20 gradually increase, the maximum space between the said lines being at the line $x$ and from the lowest gross-price mark one dollar and fifty cents, while the intermediate divisions of the spiral lines 10, produced by the several curved lines Z, which extend from the intermediate gross-value marks 10, that cross the said spiral lines, show uniform space divisions of successively-increasing distances. The advantage of thus scaling the disk into major or minor scale or gage lines is obvious when it is considered that the low-value cheese is of a minimum diameter, and hence a maximum rotary movement of the cheese is required to provide for cutting off a segment of a desired value, whereas in the highest-price cheese, whose diameter is the greatest, a minimum rotary movement of the cheese is necessary to obtain the segment of a like value.

The base 1 has a radial recess $1^c$, in which moves a sweep-arm F, which is actuated in a horizontal plane and is pivotally mounted on a stud $c^3$, axially pendent from the lower end of the post or support C, and the said arm is normally held under the tension of a spring $f$, which forces it in the direction indicated by the arrow on Fig. 2 to the cutting-line of the cheese, as shown. To the outer end of the arm F is fixedly held a vertically-disposed plate $f^2$, curved on an arc concentric with the cheese, and the said plate $f^2$ projects up through a segmental slot $2^a$ in the cover 2, which terminates at a point adjacent the cutting-line of the cheese—that is, at the vertically-slotted knife-guide G, presently again referred to—and the end of the said slot is widened, as at $a^2$, to provide a convenient sight-opening for that portion of the adjustable scale-disk previously set in harmony with the gross-value cheese mounted on the holder to be cut. The sight-opening $a^2$ is covered by a glass plate $a^3$ and is protected by a metal guard $a^4$, as shown. The plate $f^2$ is horizontally slotted or bifurcated, as indicated by $2^f$, to straddle or pass over the glass cover-plate $a^3$, and at its outer end it has a fixed vertical standard $f^3$, provided with an inwardly-projected angle-piece $3^f$, to which is pivotally connected the cheese-engaged member $f^4$, which gravitates to a horizontal position and is adapted to be sustained in a vertical position, as shown in dotted lines in Fig. 4, for reasons presently explained. The pivoted end of the drop member $f^4$ has a heel-piece $4^f$ to engage the stud $f^5$ in the angle-piece $3^f$, which prevents the said member $f^4$ from falling below the horizontal plane.

By providing for moving the member $f^4$ to a vertical plane admits of readily removing the top of the cheese-holder from the bottom plate, the said top being provided with a notch which passes over the vertically-adjusted member $f^4$ when the said member is turned back in alinement with the said notch.

The knife-guide G is disposed in radial alinement with the center post of the cheese-holder, and its knife-slot $g$ is in the same alinement. The lower end of the guide G has integral diverging foot portions for conveniently securing the said guide to the cover-plate 2.

The knife H, which may be a handle-equipped blade of sufficient length to stand through the slotted guide G to the center post or spindle C, is preferably of the shape shown, with its curved end tapered to fit freely under and be guided in the slit of the said post C.

From the foregoing description, taken in connection with the accompanying drawings, it is believed the manner in which my invention operates, together with its advantages, will be apparent.

In operation should, for example, a cheese weighing thirty pounds, at twenty cents a pound, be mounted on the holder, the gross value of the cheese would be six dollars, or equivalent to one hundred and twenty five-cent cuts or segments. The scale-plate A is then adjusted until the "$6.00" mark shows at the edge $xx$ of the sight-opening, which then brings the division-marks "5" to "25" in harmony with the "$6.00" mark into the concentric or plane of movement of the slotted vertical member of the sweep gage-arm F. The cheese is then slotted on the cutting line and the drop member $f^4$ is forced down into the cut. Assuming now that it is desired to cut off a piece of cheese of the value of twenty cents, the cheese is turned in the direction of the arrow on Fig. 1, moving back with it the gage member $f^4$ until the end of the slotted member $f^3$ thereof drops back over the "$0.20" mark, which appears in the side opening, at which time the cheese will have made one-thirtieth of a complete revolution. The knife H is then turned down through the cheese, and a true segment of the value of twenty cents—that is, a one-thirtieth part of the whole cheese—is then cut off accurately without waste and without the necessity of separating or independently adjusting the operating parts, it being obvious that should a five-cent slice be required the gage member is dropped back to the "$0.05" mark, and a slice equal to a one-hundred-and-twentieth part of the complete cheese is cut off.

The detail arrangement shown and described I have found preferable to use in practice; but I desire it understood that they may be readily modified or varied without departing from my invention or the scope of the appended claims.

Having thus described my invention, what I claim, and desire to secure by Letters Patent, is—

1. A cheese-cutting mechanism, comprising a rotatable cheese-holder, an adjustable dial having a major scale which indicates the gross value of the cheeses and a minor scale which indicates the predetermined divisional values of the cheeses and a member for gaging the movement of the cheese which coacts with the said adjustable dial, as set forth.

2. A cheese-cutting mechanism, comprising a cheese-holder, a dial having a series of major scales which indicate the gross values of the cheeses to be cut and a minor scale for each gross-value scale which indicates the predetermined divisional values of the cheese, a setting member for gaging the rotary movement of the cheese which includes an indicating-finger movable concentrically with the cheese-holder axis and adapted for movement in alinement with any one of the combined sets of the major and minor scales, as specified.

3. In a cheese-cutting mechanism as described; in combination with a rotatable cheese-holder, a sweep-arm pivoted in axial alinement with the cheese-holder and having a gage-finger concentrically movable with the axis of the cheese-holder, and adapted to engage the cut face of the cheese; of a dial having a set of major-scale marks which indicate the gross value of the cheese, a set of minor-scale marks, one for each of the major scales, and which determine the desired divisions of each gross mark, the minor-scale marks being disposed in a line concentric in the movement of the sweep-arm, the several minor-scale marks radiating from the axis of the dial, as set forth.

4. In a cheese-cutting mechanism; in combination with a rotary cheese-carrier and a gage member having an indicator-finger pivoted at the axis of the carrier to sweep in the horizontal plane and moved by contact with the cut face of the cheese when the cheese is turned; of a dial-plate radially disposed with respect to the cheese-carrier and rotatably mounted, the said dial-plate having a series of predetermined space-marks which indicate the divisional or cut values of the cheese on lines concentric with the axis of the cheese-holder over which the indicator-finger of the gage member is adapted to be moved, as set forth.

5. A dial-plate for cheese-cutting machines having a series of major-scale marks that indicate the gross value of the cheese, a series of minor-scale marks that indicate the divisional or cut values of the cheese, the said minor-scale marks extending from the major-scale marks in a spiral line toward the axis of the dial, the said dial being rotatable whereby to bring any one of the combined sets of major and minor scale marks in a line concentric with the sweep of the indicator-finger of the gage member, as set forth.

6. A cheese-cutting mechanism as described; comprising a rotatable cheese-carrier, a post projected axially thereof and having a vertical and radially-disposed slit in one side, a vertical slotted knife-guide in radial alinement with the post-slit, a rotary dial-plate whose axis is in radial alinement with the slotted knife-guide and the post, the said dial having a major scale for indicating the gross cheese values and a minor scale for indicating the predetermined divisions of the said gross values, a gage member adapted to contact with the cut face of the cheese and having a finger movable from the said major and minor scale marks on the dial and automatically returnable to the normal position and a slicing-knife guided in the slitted post and the slotted guides, as set forth.

7. In a cheese-cutting mechanism of the character described; in combination with the rotary cheese-holder, and rotary dial having divisional marks and located in a plane parallel with the plane of the rotary cheese-holder, and adapted to turn in a circle eccentric to the circle in which the rotary cheese-holder turns, of a gage member movable in an arc concentric with the cheese-holder and over the aforesaid dial-divisions, said gage including a pivotal member adapted to gravitate to the horizontal and in a position radial to the axis of the cheese-holder to contact with the cut face of the cheese and to be swung in a vertical plane for the purposes described.

8. In a cheese mechanism of the character described; in combination with the rotatable cheese-holder, mounted to rotate in a horizontal plane, a rotary dial having predetermined divisional marks and mounted in a plane parallel to the cheese-holder to turn on an axis eccentric to that of the rotatable cheese-holder, a gage pivoted on the axial line of the cheese-holder to swing in the horizontal plane, the said gage including a finger for traveling over the divisional marks of the dial and a radial member to engage the cut face of the cheese and means for automatically holding the said member in contact with and to move the said member toward the cheese.

9. A dial for cheese-cutting machines having a setting-gage movable by the cheese as it is turned to a cutting position; said dial having a series of arbitrarily-spaced marks at its periphery which indicate the different gross values of the cheese, and a series of supplemental marks for each gross-value mark disposed in a line beginning from the said gross marks and extending spirally inward to the axis of the dial, the corresponding supplemental value-marks in each series being disposed with respect to each other, in a line concentric with the axis of the cheese-holder, to be disposed by the setting-gage, as set forth.

PHILIP S. McCROSKEY.

Witnesses:
   CHAS. B. DONELAN,
   H. J. SHAVER.